United States Patent [19]

Nakagami

[11] 4,384,046

[45] May 17, 1983

[54] METHOD OF PRODUCING MULLITE CERAMIC FIBER PRODUCTS

[75] Inventor: Kashiro Nakagami, Toyohashi, Japan

[73] Assignee: Isolite Babcock Refractories Co., Ltd., Aichi, Japan

[21] Appl. No.: 320,993

[22] Filed: Nov. 13, 1981

[30] Foreign Application Priority Data

Nov. 21, 1980 [JP] Japan ............................. 55-164198

[51] Int. Cl.³ ...................... C01B 33/36; C04B 35/18; C04B 35/64; C04B 35/80
[52] U.S. Cl. ................................. 501/95; 423/327; 501/128; 501/5
[58] Field of Search ................. 501/95, 128, 127; 423/327

[56] References Cited

U.S. PATENT DOCUMENTS

| | | | |
|---|---|---|---|
| 3,458,329 | 7/1969 | Owens et al. | 501/95 |
| 3,503,765 | 3/1970 | Blaze | 501/95 |
| 3,996,145 | 12/1976 | Hepburn | 501/127 X |
| 4,101,615 | 7/1978 | Horikiri et al. | 501/127 X |
| 4,144,195 | 3/1979 | Siebels | 501/95 |
| 4,240,833 | 12/1980 | Myles | 501/128 X |
| 4,272,500 | 6/1981 | Eggerding et al. | 423/327 |

Primary Examiner—Helen M. McCarthy
Attorney, Agent, or Firm—Robert J. Edwards; Mark B. Quatt

[57] ABSTRACT

Mullite ceramic fiber produced by mixing an aluminosilicate fiber having less than 72 weight percent of $Al_2O_3$ with high-alumina substances, such as polycrystalline high-alumina fibers having more than 72 weight percent of $Al_2O_3$, and heating of the mixture to about 1,300° to 1,450° C., results in a refractory material characterized by lower bulk density, a low degree of contraction, substantial maintenance of original fiber shape, and total or nearly total consumption of free silica, with corresponding reduction in silicic acid.

1 Claim, No Drawings

METHOD OF PRODUCING MULLITE CERAMIC FIBER PRODUCTS

BACKGROUND

This invention relates to a method of producing ceramic fiber with a mullite fraction (3 $Al_2O_3.2SiO_2$).

The aluminosilicate fiber which is a known ceramic fiber and is used in various fields of application as a refractory material is generally produced by the melting-fiberizing method. In such a method, the blended raw material, consisting of silica sand and natural kaolin clay, sintered materials, or alumina, is melted in an electric furnace, and after the melted mixture is adjusted to a viscosity suitable for fiberizing, the said melted mixture is extracted in fine streams. The fiberizing is completed by blowing compressed air or by utilizing the centrifugal force of a rotating device, so that the material is in a vitreous (non-crystalline) state as a result of sudden cooling which occurs during the fiberizing process.

The range of the weight ratio of alumina ($Al_2O_3$) to silica ($SiO_2$) is most typically from 45:55 to 52:48. Although there have been attempts to produce a material with a higher alumina content for use as a high-temperature refractory material, along with the increase in the alumina content, the melting temperature becomes higher, and the fiberizing also becomes more difficult. As a result, the so-called shots (grainy forms resulting from failure in fiberizing) tend to increase. Therefore, the best ratio attained so far in this respect is 65:35.

Although aluminosilicate fiber is widely used as a high-temperature refractory material, this substance produces crystals at a higher temperature as a stabilized phase of the compositional components.

The crystallization of mullite ($3Al_2O_3.2SiO_2$) starts to take place at about 950° to 980° C., so that at 1,200° C., the theoretical amount is almost attained within several tens of hours. The inventor has discovered that, as the crystallization of the mullite progresses, the $SiO_2$ ratio in the remaining glass phase of the material increases, and that cristobalite ($SiO_2$) starts to appear in the form of crystals.

There will be several disadvantages if a portion of the $SiO_2$, which existed as aluminosilicate (aluminum silicate) glass, is transformed into free silicic acid along with the generation of the above-mentioned crystals. The first disadvantage is the adverse effect of this material on the human body. Although glass fiber which contains glass-type aluminosilicate fiber and silica is not as yet recognized as being particularly hazardous to the human body, inhalation of dust of free silicic acid substances such as silica sand, etc. may cause silicosis.

At present, it has not been determined that fiber involving the crystallization of cristobalite is hazardous; however, attention must be paid to this material in view of prevention of possible danger to human health.

The second disadvantage is the resistance of this material to chemical corrosion. Dust containing alkaline metal oxides ($Na_2O$, $K_2O$), etc., flows along with the gas inside a furnace, and the dust eventually adheres to the stuctural material of the furnace, thereby causing corrosion. Such dust is generated from the ash portion of the consumed fuel in the case of many industrial furnaces, and in the case of the iron/steel production industry or the iron casting industry, the dust is usually generated from the components of the thermal insulation materials used to maintain the surface temperature of the melted materials. Free silicic acid is vulnerable to such corrosion. Since the specific surface area of a fibrous thermal insulating material is extremely large, the vulnerability to the effects of such corrosion also becomes extremely high.

The third disadvantage is the increased brittleness of the fiber. This increased brittleness is not highly conspicuous at the mullite ($3Al_2O_3.2SiO_2$) crystallization stage, which is the first stage of the above-mentioned crystallization; however, the brittleness increases drastically as a result of the generation of cristobalite ($SiO_2$) crystals, and thereby becomes highly vulnerable to pulverization. This phenomenon is understood to be due to the fact that cristobalite undergoes a drastic shift from alpha-cristobalite (low temperature type) to beta-cristobalite (high temperature type), or vice versa, in conjunction with a great change in volume in the vicinity of 1250° C.

Since such generation of free silicic acid is undesirable, it is possible to attempt to produce a fiber having a composition such that no free silicic acid will be generated, i.e. production of a fiber with a composition in which the $SiO_2$ fraction is less than the mullite fraction ($3Al_2O_3.2SiO_2$), which is 72 weight percent $Al_2O_3$ and 28 weight percent $SiO_2$. However, such production is highly difficult, as mentioned earlier, as long as the melting fiberizing method is to be employed.

Various production methods have recently been developed in order to cope with this problem. These methods generally are classified as the precursor fiberization method. According to these methods, fiberization is conducted after adding plasticizers, etc., as required, to a solution of organic and inorganic salts of aluminum and silicon, the salts respectively transforming into $Al_2O_3$ and $SiO_2$, as a result of thermal decomposition. The thus obtained fiber is further thermally decomposed and fiber having an $Al_2O_3$-$SiO_2$) type composition is finally produced.

According to this method, it is possible to obtain fiber of nearly all types of composition. However, the fiber produced in this case is the so-called polycrystalline fiber in which the fine crystals ar bonded to one another through pores during the production process. Hence, such fiber generally has the disadvantage of having a low degree of resistance. Further, such a method involves complex processes and requires accurate control, thereby inevitably involving the disadvantage of extremely high production costs.

SUMMARY OF THE INVENTION

This invention was implemented on the basis of a discovery that cristobalite, which is free silica generated from the above-mentioned aluminosilicate fiber as the result of heating, is transformed into mullite even at a temperature level of less than 1,300° C., if heated together with polycrystalline fiber of high-alumina composition ($Al_2O_3$ in excess of 72%), which has been produced by the above-mentioned precursor fiberization method.

In the ceramic industry, mullite is often generated by heat-treatment of a mixture of raw materials, one of which is an alumina material, and another a raw material having a higher $SiO_2$ content than the composition of mullite. Generally, such methods involve treatment of the materials at a high temperature of 1,500° to 1,600° C. in order to perform the sintering operation, which is a process for further concentrating and reinforcing the materials.

This invention involves a blended and formed substance obtained by mixing an aluminosilicate fiber having less than 72 weight percent of $Al_2O_3$ and a polycrystalline high-alumina fiber having more than 72 weight percent of $Al_2O_3$. The blended substance is usually heated from about 1,300 to about 1,450° C., thereby reacting cristobalite, which is free silica generated from the aluminosilicate fiber, with the alumina of the high-alumina fiber in order to transform the blended substance into mullite.

With this method, it is possible to obtain a blended and formed body which has a suitably low bulk density as a thermal insulating material. The thus obtained material does not markedly reduce (shrink) its apparent volume even during heat processing. This is understood to be due to the fact that the reaction progresses at a comparatively low temperature because the cristobalite which has been generated from the aluminosilicate fiber under these conditions is in the form of fine crystals of 0.02 to 0.1 microns, and that the alumina crystals which form the polycrystalline high-alumina fiber are also as fine as 0.05 micron, so that both substances present a large reaction area and high reaction activity. Although the material shift necessary for the reaction is not clear, it is understood that, generally, the free silica, which as been extruded from between the grains of mullite crystals as a result of the mullite crystallization, starts to disperse and shifts to react with the alumina crystals, so that even after the completion of these reactions, both types of fiber will maintain their original shapes causing an extremely low degree of contraction.

DETAILED DESCRIPTION

The aluminosilicate fiber which can be used for the purpose of this invention is, for example, the "Kaowool" brand ($Al_2O_3$:47.3 weight percent, $SiO_2$:52.3 weight percent, others: 0.4 weight percent) or "Kaowool 1400" brand ($Al_2O_3$:5.63 weight percent, $SiO_2$:43.3 weight percent, others: 0.4 weight percent), etc. which are manufactured by Isolite-Babcock Taika Kabushiki Kaisha. As mentioned above, these products are vitreous (noncrystalline) when they are not heated.

As for the polycrystalline high-alumina fiber, those available are, for example, the "Saffil Alumina Fiber" brand ($Al_2O_3$:95 weight percent, $SiO_2$:5 weight percent, others: less than 0.05 weight percent) which is manufactured by ICI Company of the United Kingdom. The high-alumina fiber may consist of mullite crystals in an amount equal to the amount of its $SiO_2$ content and the remaining alumina crystals at the time of production or during the heating process of this invention, and the remaining alumina portion is used for the reaction with the above-mentioned free silica. Therefore, although the process will be effective if the $Al_2O_3$ is higher than the mullite fraction, it is evident that the advantages will be higher as the $Al_2O_3$ is greater; preferably more than 95 weight percent. Concerning the blending ratio of the aluminosilicate fiber and the high-alumina fiber, the total $Al_2O_3$ content should be more than 72 weight percent in order to completely consume the free silica.

|  | $Al_2O_3$ | $SiO_2$ | Blending ratio |
|---|---|---|---|
| Aluminosilicate | $X_1$ | $Y_1$ | A |
| High-alumina | $X_2$ | $Y_2$ | B |

| $Al_2O_3$ | $SiO_2$ | Blending ratio |
|---|---|---|
| $Ax_1 + Bx_2/A + B > 0.72$ | | |

However, even if the free silica is not completely consumed, and is partially retained, the effect of the invention is still valid to the extent that the free silica is consumed. Therefore, such a provision is also within the scope of this invention.

One of the forms of industrial embodiment of this invention is a method of producing the target product by performing the transformation into mullite by means of a preliminary heat treatment to the raw material. Another form of embodiment is a method of performing the transformation into mullite by heating, during or prior to the operation of the furnace, of the raw material after affixing the raw material to the wall of the furnace.

As mentioned above, it would be advantageous to use the alumina fiber as the alumina ($Al_2O_3$) to be reacted with the free silica ($SiO_2$), because the light-weight character and flexibility, which are particularly important characteristics in a fiber-shaped insulating material will not deteriorate owing to the blending of said alumina fiber. However, this invention is not limited only to the use of said alumina fiber.

The prerequisite conditions for achieving the aims of this invention are that the raw materials have an ample degree of reactivity at a temperature level of about 1,300° to about 1,450° C., and that the alumina must consist of fine crystals in order to attain this purpose. As such alumina substances, those available are, for example, in addition to the alumina fiber, sol-state alumina and gel-state alumina, as well as colloidal-state alumina. In addition, ultra-fine powdered alumina can also be used. With regard to the sol-state alumina, those available are the following products manufactured by Nissan Kagaku Kogyo Kaushiki Kaisha (Nissan Chemical Industries Co., Ltd.).

| Trade Name | $Al_2O_3$ | Grain size (rod shape) |
|---|---|---|
| Alumina-Sol 100 | 98 weight % or over (after sintering) | 0.01 microns × 0.001 microns |
| Alumina-Sol 200 | 98 weight % or over (after sintering) | 0.01 microns × 0.001 microns |

With regard to the gel-state alumina, the "$Al_2O_3$-C" brand manufactured by Nippon Aerogel Kabushiki Kaisha, is available. This product contains over 97 weight percent $Al_2O_3$ and 0.02 microns in average grain diameter. At the time of blending, various salts containing aluminum can also be used. These salts are not alumina ($Al_2O_3$) but are capable of generating alumina as a result of heat decomposition. They are, for example, aluminum chloride (Al $Cl_3$), aluminum oxychloride ($Al_2(OH)_x$ $Cl_{6-x}$), aluminum oxyacetate ($Al(OH)_x$ $(CH_3COO)_y$), etc. It is known that these substances generate $Al_2O_3$ as a result of heating, and that, in addition, they are transformed into fine alpha-$Al_2O_3$ crystals. Therefore, such fine crystals can also be used for the purpose of this invention.

EXAMPLE 1

Using latex as a binder, samples were produced using a wet process forming method.

Blending (weight parts)

| Sample | Water | Kaowool 1400 | Kaowool | Saffil | Al₂O₃—C | Latex as a dry weight |
|---|---|---|---|---|---|---|
| 1 | 1000 | 11.6 | — | 8.4 | — | 1 |
| 2 | 1000 | — | 9.8 | 10.2 | — | 1 |
| 3 | 1000 | — | 12 | 8 | — | 1 |
| 4 | 1000 | — | 14 | — | 6 | 1.5 |

Composition (weight percent)

|  | Al₂O₃ | SiO₂ |
|---|---|---|
| Kaowool 1400 | 54 | 46 |
| Kaowool | 48 | 52 |
| Saffil | 95 | 5 |
| Al₂O₃ | 97 | 3 |
| Latex | Made by Nippon Zeion K. K. Nipol L X 852 | |

(1) Fiber or fiber and powder are added to water while stirring.

(2) Latex (45% emulsion) was added to the above (1) while stirring.

(3) A small amount of aluminum sulfate was added to the above (2) as a coagulent while stirring.

(4) The material (3) was formed into a sheet of 20 mm thickness while stirring, using the vacuum forming method.

(5) As calculated, the weight percentage of the remaining silica after the completion of the transformation of each of the above-mentioned dried samples into mullite as a result of heating is as follows:

| Samples | |
|---|---|
| 1 | 0% |
| 2 | 0% |
| 3 | 7% |
| 4 | 12.7% |

Each sample was attached to a furnace wall, and was heated for 3000 hours at 1,300° C. and 1,400° C. A Kaowool blanket layer was installed on the furnace wall, and a sample (20 mm thick) was attached to the Kaowool blanket layer (on the inside of the furnace). The back surface temperatures of the sample were 1,255° to 1,265° C. and 1,357° to 1,363° C. respectively. The amount of crystallization of the sample was checked after heating, and the result was as follows:

(weight percent)

| | 1,300° C. | | | 1,400° C. | | |
|---|---|---|---|---|---|---|
| Sample | Mullite | Cristobalite | alpha-alumina | Mullite | Cristobalite | alpha-alumina |
| 1 | 94 | 1 | 3 | 96 | 0 | 1 |
| 2 | 94 | 2 | 3 | 95 | 0 | 1 |
| 3 | 87 | 9 | 2 | 88 | 7 | 0 |
| 4 | 80 | 15 | 3 | 85 | 13 | 1 |

EXAMPLE 2

As a binder, 5% starch (weight percentage in proportion to Kaowool) was added to Kaowool and a board-shaped sample was formed using the wet process forming method. The following solutions were impregnated in each sample board in order to produce 70 g of Al₂O₃ per 105 g (100 g kaowool and 5 g starch) of this board.

| | | Calculated values | |
|---|---|---|---|
| Sample | Solutions | Amount impregnated | Amount of Al₂O₃ | Remaining amount of SiO₂ (wt. %) |
| 5 | Alumina-sol (10 wt. % solution) | 710 g. | 70 g. | 3.3% |
| 6 | Aluminum chloride (30 wt. % aqueous solution) | 623 g. | 70 g. | 3.3% |

Each sample was sintered for 20 hours at 1,400° C. to obtain a board-shaped product. The degree of crystallization (weight percent) of the thus obtained product was as follows:

| Samples | Mullite | Cristobalite | alpha-alumina |
|---|---|---|---|
| 5 | 94 | 4 | 0 |
| 6 | 92 | 4 | 1 |

What is claimed is:

1. A method of producing mullite ceramic fiber products comprising blending of nitreous aluminosilicate fiber having an Al₂O₃ content of less than 72 weight percent and at least one compound of fine crystals selected from the group consisting of polycrystalline high-alumina low-silica ceramic fiber having an Al₂O₃ content of more than 72 weight percent and which may consist of mullite crystals in an amount equal to the amount of its SiO₂ content, sol-state alumina, gel-state alumina, ultra-fine powdered alumina, and a material which produces fine crystals of alpha-Al₂O₃ as a result of heating; such that the resulting mixture has a total Al₂O₃ content of more than 72 percent by weight; and heating of the resulting mixture to a temperature of about 1300° C. to 1450° C. whereby mullite is present in the final product from about 80 to 96 weight percent and alpha-alumina is 0 to about 3 weight percent.

* * * * *

UNITED STATES PATENT AND TRADEMARK OFFICE
CERTIFICATE OF CORRECTION

PATENT NO. : 4,384,046
DATED : May 17, 1983
INVENTOR(S) : K. Nakagami

It is certified that error appears in the above-identified patent and that said Letters Patent are hereby corrected as shown below:

Column 6, line 43, delete "nitreous" and substitute therefor --vitreous--

Signed and Sealed this

Sixteenth Day of August 1983

[SEAL]

Attest:

GERALD J. MOSSINGHOFF

Attesting Officer     Commissioner of Patents and Trademarks